Fig. 1.

W. F. FOLMER.
CAMERA.
APPLICATION FILED APR. 2, 1908.

923,827.

Patented June 8, 1909.
6 SHEETS—SHEET 2.

Witnesses
Walter B. Payne
Russell B. Griffiths

Inventor
William F. Folmer
By
Church–Rich
his Attorneys

W. F. FOLMER.
CAMERA.
APPLICATION FILED APR. 2, 1908.

923,827.

Patented June 8, 1909.
6 SHEETS—SHEET 3.

W. F. FOLMER.
CAMERA.
APPLICATION FILED APR. 2, 1908.

923,827.

Patented June 8, 1909.
6 SHEETS—SHEET 6.

UNITED STATES PATENT OFFICE.

WILLIAM F. FOLMER, OF ROCHESTER, NEW YORK, ASSIGNOR TO EASTMAN KODAK CO., OF ROCHESTER, NEW YORK, A CORPORATION OF NEW YORK.

CAMERA.

No. 923,827.   Specification of Letters Patent.   Patented June 8, 1909.

Application filed April 2, 1908. Serial No. 424,695.

*To all whom it may concern:*

Be it known that I, WILLIAM F. FOLMER, of Rochester, in the county of Monroe and State of New York, have invented certain new and useful Improvements in Cameras; and I do hereby declare the following to be a full, clear, and exact description of the same, reference being had to the accompanying drawings, forming a part of this specification, and to the reference-numerals marked thereon.

My present invention relates to photography and it has for its object to provide a strong and serviceable camera which can be rapidly and conveniently operated and will be suitable for such general and efficient service as is required, for instance, by press or newspaper photographers, as well as in less exacting capacities.

To these and other ends the invention consists in certain improvements and combinations of parts all as will be hereinafter more fully described, the novel features being pointed out in the claims at the end of the specification.

In the drawings: Fig. 2 is a central vertical longitudinal section thereof with the parts in the same position.

Similar reference numerals in the several figures indicate similar parts.

Figure 1:
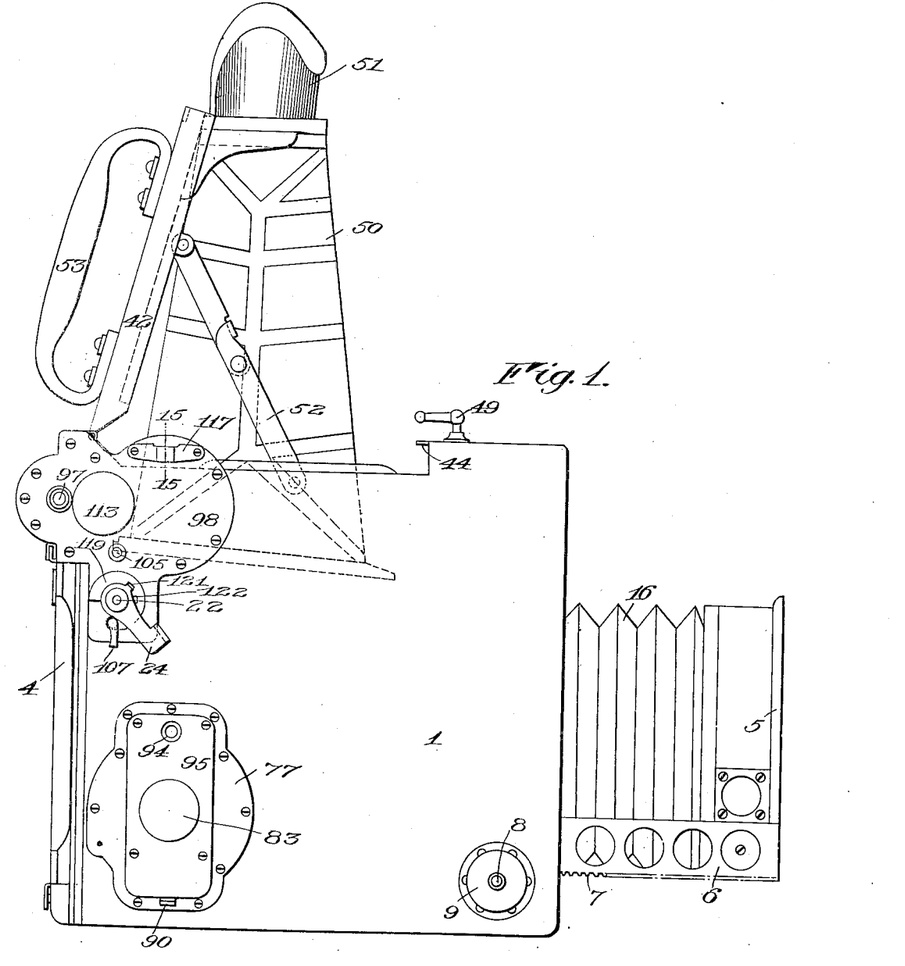
Figure 1 is a side elevation of a camera constructed in accordance with and illustrating one embodiment of my invention, the focusing hood and front being in extended positions.

Referring more particularly to the Figs. 1 and 2 of the drawings and to the reference numerals marked thereon, 1 indicates a suitable casing having an opening 2 in the front wall thereof, an exposure opening 3 in its rear wall, the latter being closed by the back 4 and the former by the front 5 supported upon slides 6 having rack teeth 7 on the inner sides engaged by pinions on an operating shaft 8 having an operating knob 9, by means of which the front is projected or retracted for focusing the lens carried thereby, as is usual. The lens board or mounting to which the lens is ordinarily attached is arranged within a seat 10 in the breast 11 on the rear of the front and is protected by the door 12, locked in its closed position by a bolt 13. In its retracted position the front remains wholly within the casing 2, the door 12 being held closed by the bolt 13 actuated by engagement with a plate 14 on the casing and released to automatically open the door by a spring 15 when the front is projected sufficiently to disengage the bolt and plate.

The bellows 16 is connected to the front 5 at its forward end, and at its rear end to the front wall 17 of a chamber 18 contained within the casing, said front wall having an opening 19 therein. The chamber is closed at the top, in the present instance, by the focusing screen 20 preferably of ground glass arranged in a frame 21, the side walls of the chamber being supplied by the corresponding walls of the casing itself. Journaled in and extending transversely of the casing and chamber 18 is a shaft 22 carrying a flap 23 which is in the present instance also a focusing mirror moved to its operative position, as shown in Fig. 2, by means of a lever 24 on the end of the shaft 22 projecting exteriorly of the casing. The mirror is held in its said operative position upon a seat 24ª by means of a latch shown in Fig. 8, comprising in the present instance, a lever 25 extending parallel with the shaft 22 and pivoted at 26 to a plate 27 secured to the seat 24 and having an ear 28 upon one arm, which engages with the projection 29 on the mirror frame, the said arm being guided beneath an ear 29ª on the plate 27. The latch is normally held in engagement, or in position for engagement, by a spring 30 and is released by a lever 31 (Fig. 2) pivoted at 32 in the side wall of the casing to operate in a plane at right angles to the plane of operation of the latch, and having a finger portion 33 on its outer arm accessible from the exterior of the casing. The inner arm of this lever is offset to project through an opening 34 in the wall of the casing and to engage the adjacent arm 35 of the lever 25, being operated against the tension of a spring 36 which normally holds the lever against a stop 37 out of engagement with the said lever 25. This lever 31 is preferably mounted upon a plate 38, and with the exception of the projecting operating portion is concealed by the usual leather or other covering of the camera to prevent the entrance of light through the aperture 34. When released the mirror 23 flies upwardly through the tension of a spring 39, to an inoperative position against a seat 40 on the frame 21 at the top of the chamber 18, the spring 39 being attached at a point eccentric to the shaft 22 and arranged in the present instance in a housing 41 on an inner wall of the casing (Fig. 22).

Figures 3, 6:
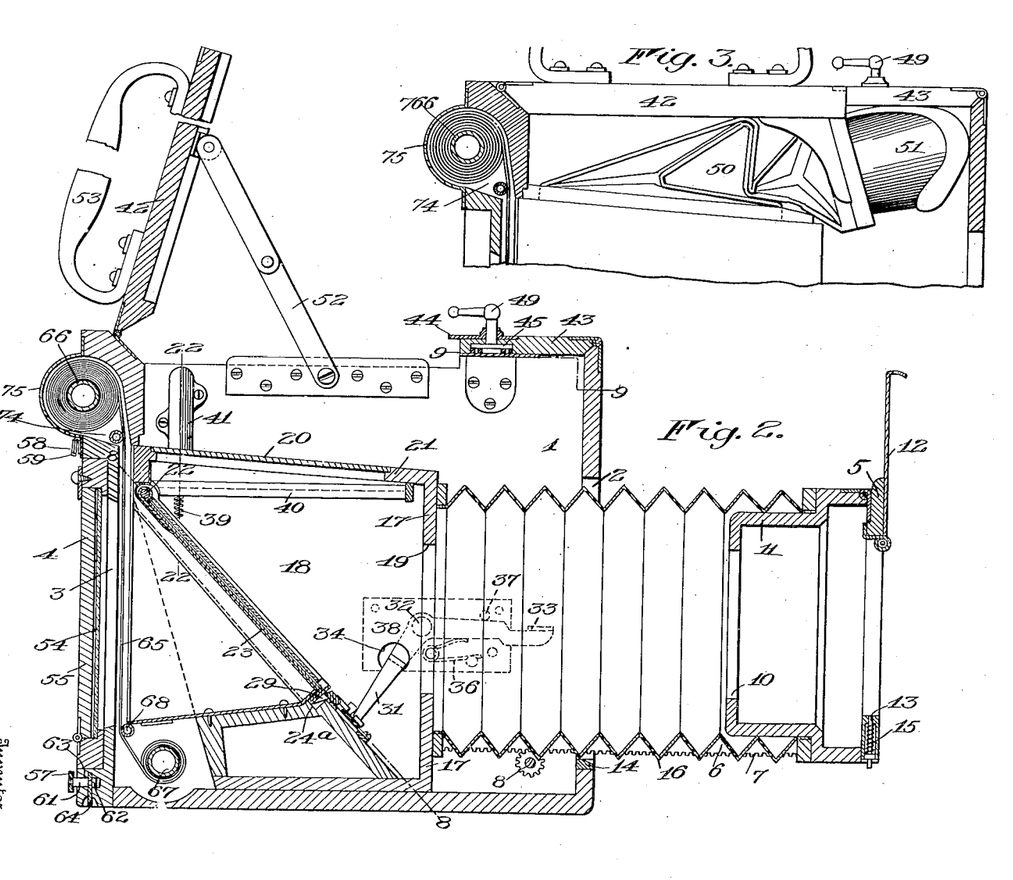
Fig. 3 is a similar fragmentary view showing the folding arrangements for the hood.
Fig. 6 is a detail perspective view of one of the securing members for the back.
Figure 4:
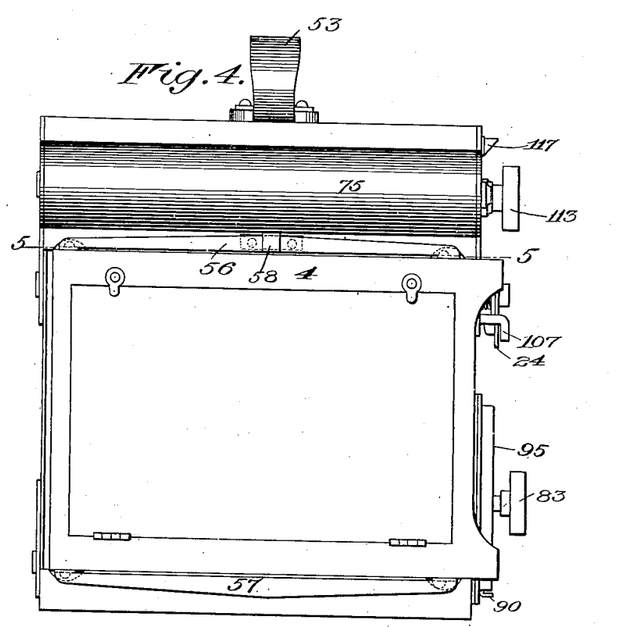
Fig. 4 is a rear view showing the camera back in elevation.
Figure 5:
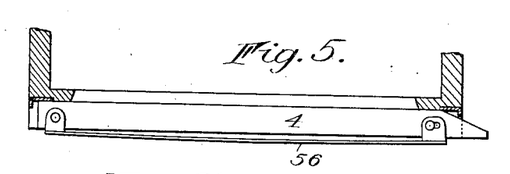
Fig. 5 is a fragmentary horizontal section on the line 5—5 of Fig. 4 showing a top plan of the camera back.
Figure 6:
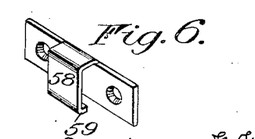
Figures 8, 9, 22, 23, 24, 25:
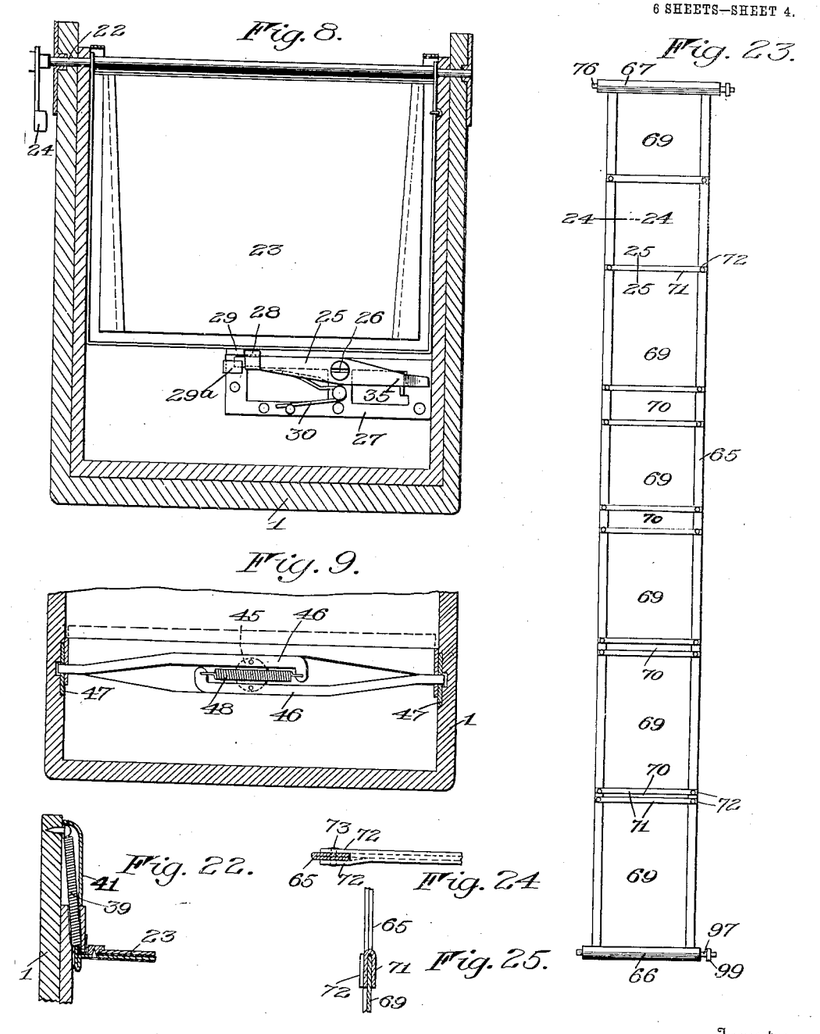
Fig. 8 is a diagonal transverse section substantially on the line 8—8 of Fig. 2 illustrating in front elevation a latch for retaining the mirror or flap in its operative position.
Fig. 9 is a detail of the locking means for the hinged cover, being a transverse horizontal section on the line 9—9 of Fig. 2.
Fig. 22 is a detail of the flap operating spring and its housing taken on the line 22—22 of Fig. 2.
Fig. 23 is a plan view of the shutter curtain extended.
Fig. 24 is a detail section thereof on the line 24—24 of Fig. 23.
Fig. 25 is a detail section on the line 25—25 of Fig. 23.

The top of the casing is formed in the present instance by the hinged cover 42 and an oppositely arranged supplementary cover 43 having a keeper strap 44 which engages over the cover 42 and secures the latter in closed position, as shown in Figs. 2 and 3, the said supplementary cover 43 being provided with locking devices shown in Figs. 2 and 9, and comprising in the present instance, a rotary disk 45 having bolts 46 pivoted thereto at opposite sides and normally actuated in engagement with keeper plates 47 on the casing, by the action of a spring 48 connected to it, the said plates being withdrawn by the rotary movement of the disk 45 imparted thereto by means of the operating or controlling member 49.

Secured at its upper end to the cover 42 and at its lower end to, or in the region of, the frame 21, carrying the focusing screen 20, is a focusing hood 50 of any preferred collapsible construction. The body of the hood is adapted to fold against the under side of the cover and occupy the space between the latter and the focusing screen 20 when the cover is closed, while the projecting eye-piece 51 shown in the present instance is accommodated beneath the supplementary cover 43, and when the cover 42 is raised the hood is so constructed as to spring to its operative position where it is held by the usual links 52 connecting the cover and casing. The cover is also provided with a handle portion 53 preferably extending transversely to the axis of its movement and which acts both as a handle for carrying the camera as a whole, and for effecting the movement of the cover itself. The controlling member 49 of the locking device for the supplementary cover 43 projects in the direction of and adjacent to the handle portion 53, so that should the operator be carrying the camera in one hand, and suddenly desire to make a snap-shot or instantaneous exposure without loss of time, his thumb or finger can conveniently release the locking device, whereat the camera will drop from the cover and its weight will operate the focusing hood to its expanded position. (Figs. 1 and 3).

Figure 7:
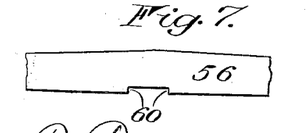
Fig. 7 is a detail elevation of the resilient part coöperating with said securing member.

As best shown, in the present instance, the camera is constructed for the use of photographic plates rather than film, the back 4 having a resilient connection with the casing whereby it can be displaced outwardly and the plate-holder inserted and held in front thereof or between it and the casing and in register with the exposure aperture 3, as usual, the said back being provided with a supplementary focusing screen 54 accessible through a door 55, and occupying, interchangeably with the plates in the plate-holder, a position in the focal plane of the camera. As it is often necessary to remove the camera-back entirely, the yielding connections above referred to are also rendered detachable and comprise in the present instance, (Figs. 1, 2, 4, 5, 6 and 7), resilient members 56 and 57 secured to the back 4 at opposite ends, the upper member 56 engaging behind a securing device 58 on the casing embodying (Fig. 6) a downwardly extending ear having an inwardly projecting locking shoulder 59. The member 56 (Fig. 7) is provided on its lower edge with a recess forming abutments 60 and when the member is pressed behind the securing ear, and thence moved outwardly by virtue of its own resiliency, it springs into place beneath the locking shoulder with the abutments 60 engaging upon either side of the latter, and the upper portion of the back is thus held against both downward and lateral movement.

The lower connecting member 57 is locked to the casing in a manner to control the connection of the other member with the securing device just described, and in the present instance is provided with a plug or projection 61 having an abutment 62 and adapted to enter a recess 63 in the casing. Locking means comprising in the present instance a sliding plate 64 movable transversely of the recess is brought into engagement above the abutment 62 when the plug is in place, securely locking the lower portion of the back to the casing.

The camera in the present embodiment is fitted with a shutter of the focal plane type comprising a flexible curtain 65, which as to its general nature, is constructed in substantial accordance with my prior patent No. 843,140, dated February 5th, 1907, and it is fed from a feed roller 66 to a lower winding roller 67 over guide rollers 68 and across the exposure opening 3 in front of the plate or sensitized material to effect the exposure. The curtain is preferably constructed from a single sheet of flexible material, such as black cloth, having opaque portions 69 and intermediate openings 70, the longitudinal edges of the sheet being doubled back upon themselves to form flexible tapes connecting the opaque portions at the sides of the openings, the said connecting tapes being thus reinforced in a simple manner to possess adequate strength. The transversely extending edges of the opaque portions which define the opening are provided with binding strips 71 which extend upon both surfaces of the curtain and have bifurcated ends 72 between which the said tapes are secured as by rivets 73. The arrangements just described form a cheap, simple and convenient means for stiffening the opaque portions in their movement across the exposure opening in order that the plane of movement may be well defined, and the shutter-openings sharp and distinct.

The upper, and in the present instance, feed-roller 66, is arranged (Fig. 2) in rear of the plane of movement of the curtain, in order that more room may be provided within the casing for the focusing devices generally, and particularly the shaft of the flap or flexible mirror 23, which may be mounted at the extreme rear of the casing and chamber 18. To this end I prefer to provide a recess 74 in rear of the casing 1 and above the support for the plates or recording devices, within which recess or chamber the roller 66 is partially arranged, its outside and the convolution of the curtain when wound thereon, being protected by a plate 75 forming a breast which projects rearwardly from the rear face of the casing, and the said roller is thus accommodated at the point before described, without adding materially to the bulk of the camera as a whole.

Figures 12, 15, 19, 20:
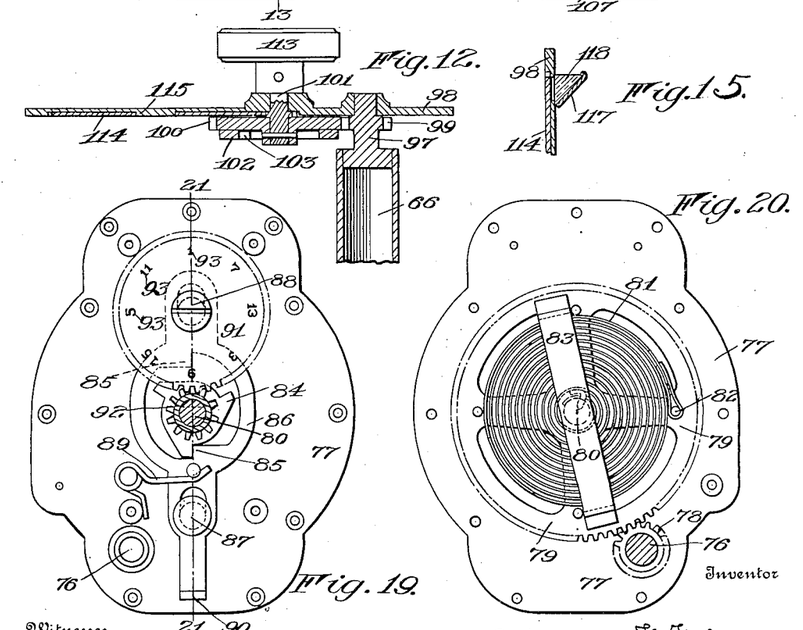
Fig. 12 is a horizontal section on the line 12—12 of Fig. 10.
Fig. 15 is a vertical section through the reflecting means, in detail, for the index of the exposure mechanism taken on the line 15—15 of Fig. 1.
Fig. 19 is an elevation of the mounting plate and speed controlling mechanism of the shutter carried thereby, the cover plate being removed.
Fig. 20 is an elevation of the inner face of the same mounting plate showing a tension member carried thereby.
Figure 13:
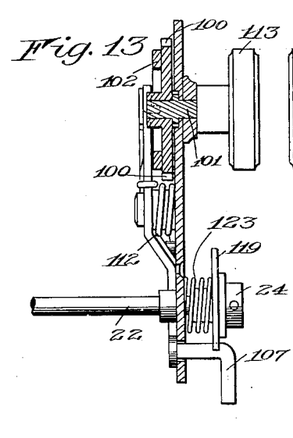
Fig. 13 is a vertical section on the line 13—13 of Fig. 10.
Figure 14:
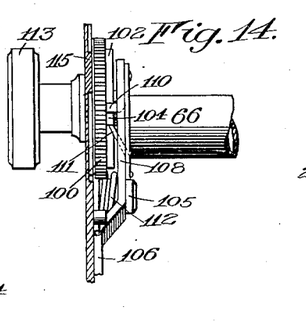
Fig. 14 is a substantially vertical section on the line 14—14 of Fig. 11.
Figures 16, 17, 21:
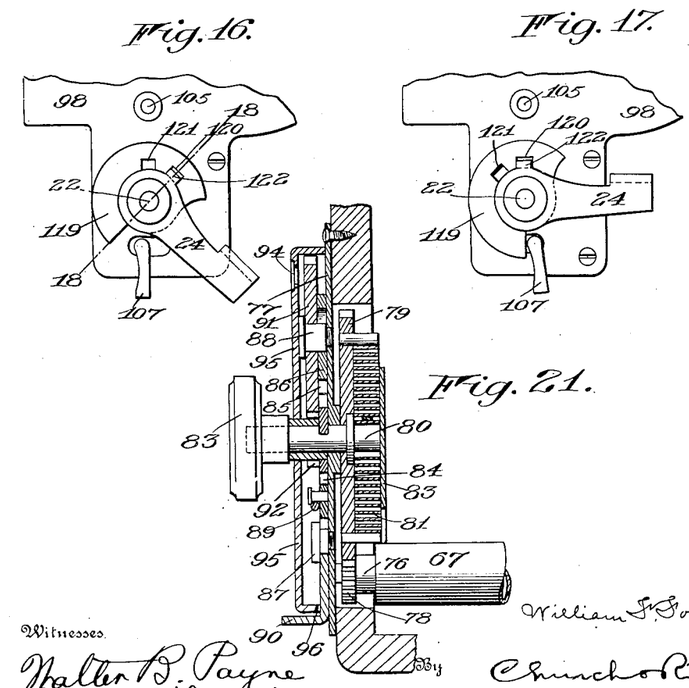
Fig. 16 is an enlarged detail elevation of the automatic shutter operating mechanism set for instantaneous work with the parts in the positions occupied before actuation of the mirror or flap.
Fig. 17 is a view similar to Fig. 16, but with the parts in the position they occupy after the actuation of the mirror or flap.
Fig. 21 is a vertical section on the line 21—21 of Fig. 19.
Figure 18:
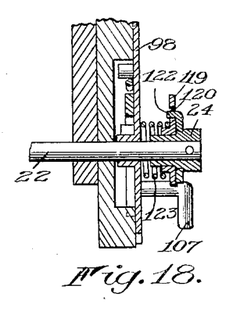
Fig. 18 is a section on the line 18—18 of Fig. 16.

Referring now to Figs. 19 to 21, the lower curtain roller 67 is in the present instance the winding roller and is carried upon a shaft 76 journaled at one end in a mounting or plate 77 secured to the casing 1, and carrying also a winding device including the driving mechanism and the adjustable controlling mechanism therefor, which I will now proceed to describe. Carried on the shaft 76 is a gear 78 meshing with a toothed disk 79 loosely mounted on a stud shaft 80 on the plate 77 and rotated by a spiral spring 81 connected thereto at its outer end 82 and to the shaft 80 at its inner end, the said spring being held from lateral displacement by a strap 83 on the disk 79. The spring or tension member 81 thus provides a means for driving the winding roller 67 and moving the curtain off from the feed roller 66. The outer end of the stud shaft 80 terminates in an operating or winding knob 83 and it is also provided with a series of spaced teeth 84 forming stop abutments adapted to connect with coöperating abutments 85 on an escapement member 86 slotted to reciprocate upon guides formed in the present instance by a pin 87 and a stud shaft 88 both on the plate 77, the reciprocation being effected in one direction through a spring 89 and in the other by manual operation of a finger-piece 90 through the alternately exerted influence of which the stud or winding shaft 80 is allowed to rotate intermittently in either direction through the space of the distance between the stops 84, as will be understood. The rotation of the shaft 80 moves simultaneously a toothed index wheel 91 driven by a gear 92 on the shaft which meshes with the wheel, the latter being journaled on the stud 88 and provided with a series of characters 93, from which is determined the extent to which the winding shaft has been rotated, and from which is ascertained the tension exerted upon the said shaft and similarly the roller shaft 76 by the tension member 81. As a means for indicating the particular recording characters at a given tension of the spring, I provide an indicator which is arranged in the endless path of movement of the said characters, and coöperates with but one of the latter at a time. This indicator is preferably formed by an aperture 94 (Fig. 1) in a cover plate 95 secured to the plate 77 and which conceals the index wheel as a whole and the controlling mechanism. The operating portion 90 of the escapement projects through an opening 96 at the lower edge thereof.

When the tension member is being wound up by means of the knob 83 on its winding shaft, the said shaft is prevented from retrograde movement by the engagement of one of the abutments 85 on the spring actuated escapement 86 with the stops 84 successively, and each of such engagements marks an advance in the tension of the spring 81 and the index wheel 91 is moved accordingly. As it is convenient to the operator that each manual effort expended in rotating the knob 83 should produce only a partial rotation of the shaft, I prefer to provide a plurality of stops 84 as shown, resulting in frequent halts of the index wheel relatively to the indicator aperture 94, and furthermore the said wheel being directly driven by the shaft travels a considerable distance at each actuation of the knob shaft from one step to the next. It is, however, not expedient that a character should be registered at each stop, as the differences in the relative tensions produced would be slight. On the other hand, a very large index wheel would be required were the characters arranged thereon to pass the indicator in the sequence of their values. In order, therefore, to use a smaller directly driven index wheel, and because of other considerations, I arrange the characters out of the order of their values, substantially as shown, for instance in Fig. 19, and so proportion the relative diameters of the index wheel with its driving gear 92 and in relation to the stops 84 that each movement of the shaft from one stop to the next will result in the indicator registering in the interval between the last recorded character and the succeeding character not next in value; between two succeeding characters not next in value; between a succeeding character not next in value and the next character in value, or upon the next character in point of value. To illustrate:—In Fig. 19 the indicator is registering the character 1. At the first stop, upon winding the shaft, the indicator will have nearly reached 7. At the next it will be between 7 and 13; at the next slightly beyond 13 and at the fourth in register with the next character in point of value which will be 3. If the speed of the shutter is to be reduced when set for high tension, the escapement 86 is released intermittently by pressure on the finger-piece 90; and the characters on the index wheel will be registered in the same but inverse order, until that representing the lower tension desired is opposite the indicator.

The upper and in the present instance, feed-roller 66, is mounted upon a shaft 97 (Figs. 10 and 11) journaled at one end in a plate 98 secured to the upper portion of the side wall of the casing 1 and upon which plate is also mounted coöperating mechanism for rewinding the shutter after an exposure and releasing it for an exposure. Carried on the shaft 97 is a gear 99 driving a gear 100 mounted upon a stud shaft 101 journaled on the plate 98 and terminating in a knob 113 on the exterior of the camera. Fixed to the gear 100 and therefore movable with the shaft 97 and its roller, is a revoluble annular member 102 provided with a plurality (two in the present instance) of inwardly extending winding stops 103 and an outwardly extending arresting stop 104. Pivoted to the plate as at 105 is an operating lever 106 having a finger-piece 107 projecting through a slot in the plate to the exterior of the camera. The opposite end of this lever is forked or bifurcated to form arms 107 and 108, the arm 107 being provided with an abutment 109 movable into and out of the path of and in contact with the winding stops 103, and the other with an abutment 110 movable simultaneously into and out of the path of and in connection with the arresting stop 104, a spring finger 111 being arranged opposite thereto to spring in rear of the stop 104 when the latter engages the abutment 110 and after being displaced by said stop, prevents retrograde movement of the revoluble member 102. The abutment 109 is normally held in engagement with one of the winding stops 103 through the action of a spring 112, the curtain being under tension from the driving spring 81 of the speed controlling device and tending to rotate its shaft 97 and the revoluble member 102.

Figure 10:
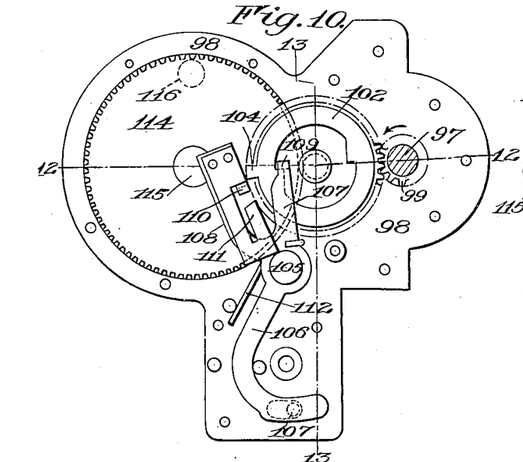
Fig. 10 is an elevation of the inner face of the mounting plate showing the releasing mechanism of the camera shutter in the position preceding an exposure.
Figure 11:
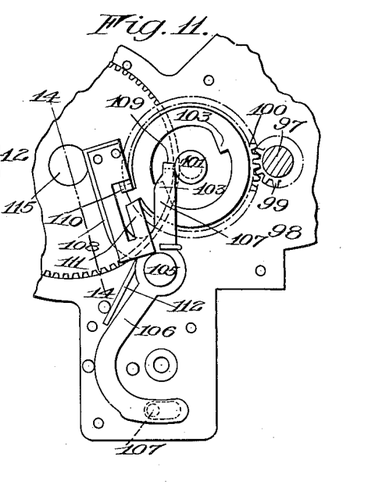
Fig. 11 is a similar fragmentary view showing the same parts in released position.

When the curtain is to be wound upon the feed roller 66 for an exposure the knob 113 is manually rotated, and through the gear 100 rotates roller shaft 97, the winding stops 103 being successively engaged by the abutment 109 on the lever 106 and the abutment 110 thereon being out of the path of the arresting stop 107, as shown in Fig. 10. The curtain is then set and upon an oscillation of the lever 106 by moving the finger-piece 107, the abutment 109 moves toward the center of the annular member 102 out of the path of the winding stops 103, and the abutment 110 moves into the path of the arresting stop 104, which latter engages it upon a full rotation of the said member 102, as driven through the gearing 99. After the releasing movement of the lever 106 is completed, the abutment 110 is moved out of engagement with the arresting stop 104 and the abutment 109 moves back into engagement with one of the winding stops 103 through the ends of the spring 112. A single rotation of the gear 100 and member 102 allows a sufficient number of rotations of the roller shaft 97 to pass enough of the curtain from the feed to the winding roller to effect the desired exposure.

An index wheel 114 journaled on the stud 115 on the stop 98 is driven by the said shaft 101, the characters thereon being viewable through an aperture 116 in the plate 98 (shown in dotted lines in Fig. 10) which index indicates to the operator the position of the curtain upon the rollers; or in other words, the exposure for which the shutter is set. In order to render the indications on this index conveniently viewable to the operator from above the camera, I provide means for reflecting images as seen through the opening 116 in a vertical direction. The said means is shown in detail in Fig. 15 and comprises in the present instance a bracket 117 secured to the plate 98 and carrying an optical prism 118 held adjacent the opening 116, so that the character in register therewith is reflected upwardly.

In order to effect an operation of the shutter instantaneously with the movement of the mirror 23, when rotated from an operative to an inoperative position, after the focusing of the subject has been completed, and without loss of time, I provide arrangements best illustrated in Figs. 1—13—16—
17 and 18. The finger-portion 107 of the operating lever 106 of the exposure controlling mechanism is arranged adjacent to the outer projecting end of the mirror shaft 22 and in the path of a segmental disk 119 carried on and revoluble with the shaft 22. The disk is locked for rotation with the shaft by the engagement within apertures 120 and 121 therein of a projection 122 on the shaft, and formed in the present instance by an ear on the mirror operating lever 24, the disk being held in such engagement by the spring 123 interposed between it and the plate 98. As the mirror shaft 22 is a rock shaft, and has but a limited movement, the apertures 120 and 121 are arranged at different relative distances on the circumference of the segment, so that when the projection 122 is in engagement with the frame, the disk will be rotated a sufficient distance with the shaft 22 when the mirror is released, by means of the lever 33, to trip the operating member 107 of the shutter controlling lever 106 and release the shutter, but when it is desired to use the mirror independently of the shutter, as for a time exposure, the projection 122 is brought into engagement with the aperture 121, with which arrangement the segment 119 is not sufficiently advanced with the partial rotation of the shaft 22 to trip the member 107, and the shutter may therefore be independently operated.

I claim as my invention:

1. In a camera, the combination with a casing, a hinged cover therefor having a handle portion and focusing devices arranged beneath the cover, of means for locking the latter in closed position and an operating member controlling said means arranged adjacent to the handle portion of the cover.
2. In a camera, the combination with a casing, a hinged cover therefor having a handle portion extending transversely to its axis and focusing devices arranged beneath the cover, of means for locking the latter in closed position and an operating member controlling said means projecting toward and arranged adjacent to the handle portion of the cover.

3. In a camera, the combination with a casing, a hinged cover therefor having a handle portion and a folding focusing hood arranged beneath the cover and expanded to an operative position through the opening movement of the latter, of means for locking the cover in closed position and an operating member controlling said means arranged adjacent to the handle portion of the cover.

4. In a camera, the combination with a casing having a chamber therein and an aperture in one of its walls, a flap movable within the chamber and a latch coöperating therewith, of a controlling device for said latch embodying a lever pivoted to the casing having one arm accessible from the exterior of the latter and the other projecting through the aperture and engaging the latch.

5. In a camera, the combination with a casing or body portion and a back therefor, of yielding connections between said parts comprising resilient members carried by one of them, a securing device on the other with which one of said members is adapted to engage and having a locking shoulder coöperating with the latter and means for locking the other member to said last mentioned part.

6. In a camera, the combination with a casing or body portion and a back therefor, of yielding connections between said parts comprising resilient members carried by one of them, a securing device on the other with which one of said members is adapted to engage and having a locking shoulder coöperating with abutments on the member to prevent movement of the latter relatively thereto and means for locking the other member to said last mentioned part.

7. In a camera, the combination with a casing or body portion and a back therefor, of yielding connections between said parts comprising resilient members carried by one of them, a securing device on the other with which one of said members is adapted to engage and having a locking shoulder thereon coöperating with the member through the resiliency of the latter and means for locking the other resilient member to said last mentioned part.

8. In a camera, the combination with a casing or body portion and a back therefor, of yielding connections between said parts comprising resilient members carried by one of them, one of said resilient members being provided with a plug or projection, a securing device on the other part with which the other securing member is adapted to engage, said part being provided with a recess for the reception of the plug on the first mentioned member, and means for locking the plug in the recess.

9. In a camera, the combination with a casing and a support for recording devices in rear thereof, said casing being provided with an elongated recess or chamber arranged above said support, of a curtain shutter arranged to operate in front of recording devices arranged in the support, feed and winding devices for said curtain, one embodying a roller partially arranged in the recess in the casing and a breast or cover plate for the roller projecting rearwardly from the rear face of the casing.

10. In a camera, the combination with a casing, a shutter mechanism arranged therein and an adjustable mechanism for controlling the exposure of the shutter, of an index and an indicator therefor movable relatively to each other in an endless path with the adjusting movements of the controlling mechanism, the characters on the index being so arranged as to pass the indicator successively out of the order of their values, and a stop mechanism for bringing the characters of the index to a stop relatively to and in register with the indicator, each consecutively in the order of its value.

11. In a camera, the combination with a casing, a shutter mechanism arranged therein and an adjustable mechanism for controlling the exposure of the shutter, of an index and an indicator therefor movable relatively to each other in an endless path with the adjusting movements of the controlling mechanism the characters on the index being so arranged as to pass the indicator successively out of the order of their values, a stop mechanism for bringing the characters of the index to a stop relatively to and in register with the indicator each consecutively in the order of its value and means for concealing all the characters except the one being indicated.

12. In a camera, the combination with a casing, a shutter mechanism arranged therein embodying a spring and mechanism for controlling the exposure of the shutter by varying the tension of the spring, of an index having characters thereon the relative values of which represent different degrees of tension of the spring and an indicator for the index, the index and indicator being movable relatively to each other in an endless path with the movements of the controlling mechanism as the tension of the spring is varied, the character of the index being equally spaced from each other and so arranged as to pass the indicator successively out of the order of their values and a stop mechanism for halting relative movement of the index and indicator at predetermined intervals of travel, the indicator at each halt after an indication being stopped to indicate a character next in value or between the intervening characters.

13. In a camera, the combination with a casing, a shutter mechanism arranged therein and adjustable mechanism including a shaft for controlling the exposure of the shutter, of an index wheel, having characters arranged circumferentially thereof, out of the order of their values, driving connections between the shaft and index wheel, a cover plate for the latter having an opening therein arranged in the path of the characters and a stop mechanism for bringing the latter in register with the opening in the cover plate, each consecutively in the order of its value.

14. In a camera, the combination with a casing, feed and winding rollers carried thereby and a curtain shutter operated by said rollers, of a tension member for driving the winding roller, a winding shaft for the tension member having abutments thereon, an index wheel driven with the shaft and mounted upon a stud, and an escapement for the shaft comprising a reciprocating member coöperating intermittently with the abutments and guided on the stud.

15. In a camera, the combination with a casing, curtain rollers mounted therein, a curtain shutter movable with the rollers and actuating means for one of the latter, of controlling mechanism arranged to operate with the curtain and comprising a revoluble member having a plurality of winding stops and an arresting stop, means normally arranged in the path of and engaging the winding stops and means engaging the arresting stop after a full rotation of the revoluble member upon the release of said first mentioned means.

16. In a camera, the combination with a casing, curtain rollers mounted therein, a curtain shutter movable with the rollers and actuating means for one of the latter, of controlling mechanism arranged to operate with the curtain and comprising a revoluble member having a plurality of winding stops and an arresting stop, and an operating member normally engaging the winding stops and movable to engage the arresting stop after each full rotation of the revoluble member.

17. In a camera, the combination with a casing, curtain rollers mounted therein, a curtain shutter movable with the rollers and actuating means for one of the latter, of controlling mechanism arranged to operate with the curtain and comprising an annular revoluble member having a plurality of inwardly projecting winding stops on its inner circumference and an outwardly projecting arresting stop on its outer circumference, means normally arranged in the path of and engaging the winding stops and means engaging the arresting stop after a full rotation of the revoluble member upon the release of said first mentioned means.

18. In a camera, the combination with a casing, curtain rollers mounted therein, a curtain shutter movable with the rollers and actuating means for one of the latter, of controlling mechanism arranged to operate with the curtain and comprising a revoluble member having a plurality of winding stops and an arresting stop, and an operating lever pivoted to the casing and having a forked arm, each fork being provided with an abutment adapted to engage the winding and arresting stops, respectively, and moved alternately into and out of such respective engagement upon the oscillation of the lever.

19. In a camera, the combination with a casing having a lateral opening therein and suitable shutter mechanism arranged in the casing, of an index member movable with the shutter mechanism, mounted in the casing, its characters being viewable through the opening and means for reflecting the image of said character in a substantially vertical direction.

20. In a camera, the combination with a casing provided with a laterally arranged cover plate having an opening therein, suitable shutter mechanism arranged in the casing and an index member movable therewith and mounted on the inner side of the cover plate, its characters being viewable through the opening in the latter, of an optical prism secured upon the outer side of the cover plate adjacent the opening for reflecting the images of the characters in a direction parallel with the cover plate.

21. In a camera, the combination with a casing, a shaft journaled therein, a focusing mirror movable with the shaft to operative and inoperative positions, and a segmental disk rotatable with the shaft, of a shutter mechanism arranged in the casing and a releasing member therefor arranged in the path of the disk and operated thereby when the mirror is moved to its inoperative position.

22. In a camera, the combination with a casing and rollers mounted therein, of a curtain shutter movable on the rollers and comprising flexible opaque portions and side tapes connecting them to form an intermediate opening, the edges of said opaque portions adjacent the openings being each provided with an integral binding strip of relatively inflexible material, extending upon both surfaces of the curtain and having bifurcated ends between which the side taps are secured.

23. In a camera, the combination with a casing and rollers mounted therein, of a curtain shutter movable on the rollers and comprising a continuous sheet of flexible material having opaque portions and an intermediate opening, the longitudinal edges of the sheet being turned back or doubled to form connecting tapes between the opaque portions, and the transverse edges of the latter being provided with integral binding strips of relatively inflexible material extending upon both surfaces of the curtain and having bifurcated ends between which the side tapes are secured.

WILLIAM F. FOLMER.

Witnesses:
RUSSELL B. GRIFFITH,
HAROLD H. SIMMS.